(12) United States Patent
Cheng et al.

(10) Patent No.: US 8,625,484 B2
(45) Date of Patent: Jan. 7, 2014

(54) METHODS AND APPARATUS FOR PROVIDING FAST AND POWER EFFICIENT MULTICAST SCHEME

(75) Inventors: Steven Cheng, San Diego, CA (US); Patrick Lim, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 826 days.

(21) Appl. No.: 12/365,897

(22) Filed: Feb. 5, 2009

(65) Prior Publication Data

US 2010/0195555 A1    Aug. 5, 2010

(51) Int. Cl.
*H04W 4/00*       (2009.01)
*H04L 1/00*       (2006.01)

(52) U.S. Cl.
USPC ............................. 370/328; 370/338; 370/252

(58) Field of Classification Search
USPC .......................................... 370/310–350, 432
See application file for complete search history.

(56) References Cited

U.S. PATENT DOCUMENTS

| 2005/0201269 | A1* | 9/2005 | Shim et al. ..................... 370/208 |
| 2007/0060149 | A1* | 3/2007 | Lim et al. ...................... 455/445 |
| 2008/0198830 | A1  | 8/2008 | Mohanty et al. |
| 2008/0219161 | A1* | 9/2008 | Lee et al. ....................... 370/230 |
| 2009/0092076 | A1* | 4/2009 | Zheng et al. ................... 370/328 |
| 2011/0110305 | A1* | 5/2011 | Wang et al. .................... 370/328 |

FOREIGN PATENT DOCUMENTS

| EP | 1804526 | 7/2007 |
| EP | 1903813 | 3/2008 |
| GB | 2447635 | 9/2008 |

OTHER PUBLICATIONS

Written Opinion—PCT/US2010/023249—ISA/EPO—May 10, 2010.
International Search Report—PCT/US2010/023249, International Search Authority—European Patent Office—Apr. 29, 2010.

* cited by examiner

*Primary Examiner* — Warner Wong
(74) *Attorney, Agent, or Firm* — Tyler J. Overall

(57) ABSTRACT

A base station (BS) may determine a fixed modulation scheme, a fixed PDU payload size, and a fixed number of PDUs per downlink burst for transmission of multicast data to subscriber stations. The BS may allocate downlink bursts to deliver the multicast data to the subscriber stations via PDUs using the fixed modulation scheme, the fixed PDU payload size, and the fixed number of PDUs per DL burst. A subscriber station (SS) may bypass the processing of multicast frames if the SS does not belong to any multicast groups. An SS may search for multicast connection identifiers (CIDs) in DL MAP IEs in multicast frames if the SS belongs to at least one multicast group. The SS may bypass the parsing of a PDU's MAC header within a corresponding downlink burst in the multicast frame in response to identifying a multicast CID in a DL-MAP IE in a multicast frame.

17 Claims, 11 Drawing Sheets

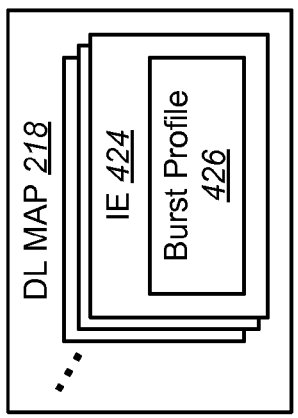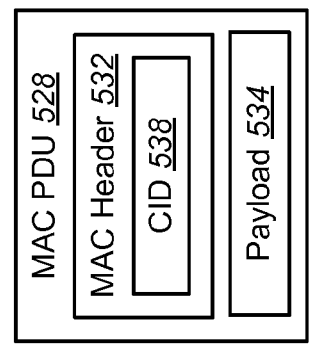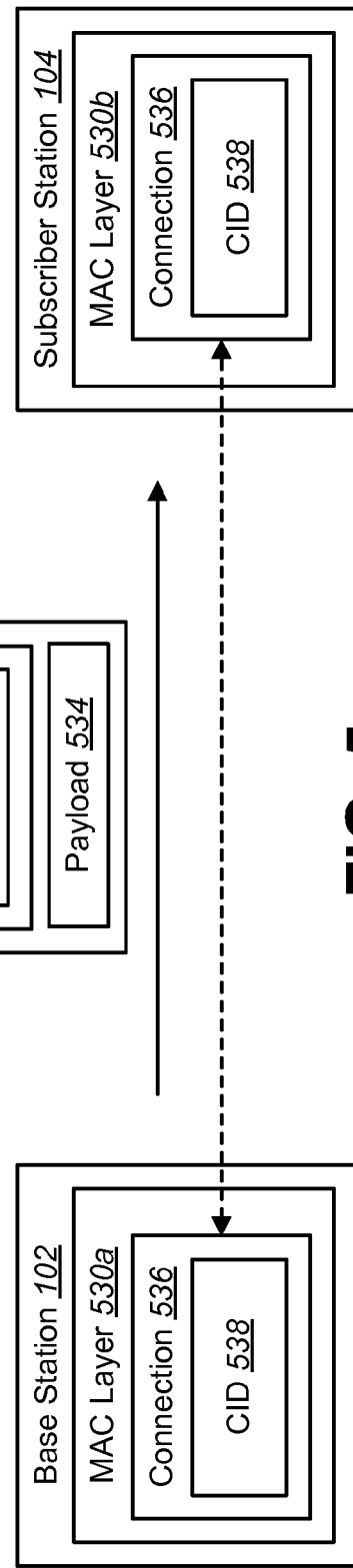
FIG. 4
FIG. 5

METHODS AND APPARATUS FOR PROVIDING FAST AND POWER EFFICIENT MULTICAST SCHEME

TECHNICAL FIELD

The present disclosure relates generally to communication systems. More specifically, the present disclosure relates to methods and apparatus for providing a fast and power efficient multicast scheme.

SUMMARY

Certain embodiments include a method for providing a fast and power efficient multicast scheme is disclosed. The method may be implemented by a base station. The method may include determining a fixed modulation scheme, a fixed protocol data unit (PDU) payload size, and a fixed number of PDUs per downlink burst for transmission of multicast data to subscriber stations. The method may also include allocating downlink bursts to deliver the multicast data to the subscriber stations via PDUs using the fixed modulation scheme, the fixed PDU payload size, and the fixed number of PDUs per DL burst.

Certain embodiments include a method for providing a fast and power efficient multicast scheme is also disclosed. The method may be implemented by a subscriber station. The method may include bypassing the processing of multicast frames if the subscriber station does not belong to any multicast groups. The method may also include searching for multicast connection identifiers (CIDs) in downlink (DL) MAP information elements (IEs) in multicast frames if the subscriber station belongs to at least one multicast group. The method may also include bypassing the parsing of a protocol data unit's medium access control (MAC) header within a corresponding downlink burst in the multicast frame in response to identifying a multicast CID in a DL-MAP IE in a multicast frame.

Certain embodiments include a base station for providing a fast and power efficient multicast scheme is also disclosed. The base station may include a processor. The base station may also include memory in electronic communication with the processor. The base station may also include instructions stored in the memory. The instructions may be executable by the processor to determine a fixed modulation scheme, a fixed protocol data unit (PDU) payload size, and a fixed number of PDUs per downlink burst for transmission of multicast data to subscriber stations. The instructions may also be executable to allocate downlink bursts to deliver the multicast data to the subscriber stations via PDUs using the fixed modulation scheme, the fixed PDU payload size, and the fixed number of PDUs per DL burst.

Certain embodiments include a subscriber station for providing a fast and power efficient multicast scheme is also disclosed. The subscriber station may include a processor. The subscriber station may also include memory in electronic communication with the processor. The subscriber station may also include instructions stored in the memory. The instructions may be executable by the processor to bypass the processing of multicast frames if the subscriber station does not belong to any multicast groups. The instructions may also be executable to search for multicast connection identifiers (CIDs) in downlink (DL) MAP information elements (IEs) in multicast frames if the subscriber station belongs to at least one multicast group. The instructions may also be executable to bypass the parsing of a protocol data unit's medium access control (MAC) header within a corresponding downlink burst in the multicast frame in response to identifying a multicast CID in a DL-MAP IE in a multicast frame.

Certain embodiments include a base station for providing a fast and power efficient multicast scheme is also disclosed. The base station may include means for determining a fixed modulation scheme, a fixed protocol data unit (PDU) payload size, and a fixed number of PDUs per downlink burst for transmission of multicast data to subscriber stations. The base station may also include means for allocating downlink bursts to deliver the multicast data to the subscriber stations via PDUs using the fixed modulation scheme, the fixed PDU payload size, and the fixed number of PDUs per DL burst.

Certain embodiments include a subscriber station for providing a fast and power efficient multicast scheme is also disclosed. The subscriber station may include means for bypassing the processing of multicast frames if the subscriber station does not belong to any multicast groups. The subscriber station may also means for searching for multicast connection identifiers (CIDs) in downlink (DL) MAP information elements (IEs) in multicast frames if the subscriber station belongs to at least one multicast group. The subscriber station may also include means for bypassing the parsing of a protocol data unit's medium access control (MAC) header within a corresponding downlink burst in the multicast frame in response to identifying a multicast CID in a DL-MAP IE in a multicast frame.

Certain embodiments include a computer-program product for facilitating a base station to provide a fast and power efficient multicast scheme is also disclosed. The computer-program product may include a computer-readable medium having instructions thereon. The instructions may include code for determining a fixed modulation scheme, a fixed protocol data unit (PDU) payload size, and a fixed number of PDUs per downlink burst for transmission of multicast data to subscriber stations. The computer-readable medium may also include code for allocating downlink bursts to deliver the multicast data to the subscriber stations via PDUs using the fixed modulation scheme, the fixed PDU payload size, and the fixed number of PDUs per DL burst.

Certain embodiments include a computer-program product for facilitating a subscriber station to provide a fast and power efficient multicast scheme is also disclosed. The computer-program product may include a computer-readable medium having instructions thereon. The instructions may include code for bypassing the processing of multicast frames if the subscriber station does not belong to any multicast groups. The computer-program product may also include code for searching for multicast connection identifiers (CIDs) in downlink (DL) MAP information elements (IEs) in multicast frames if the subscriber station belongs to at least one multicast group. The computer-program product may include code for bypassing the parsing of a protocol data unit's medium access control (MAC) header within a corresponding downlink burst in the multicast frame in response to identifying a multicast CID in a DL-MAP IE in a multicast frame.

Certain embodiments as described herein, including the summary paragraphs above, wherein the subscriber station and/or the base station supports an Institute of Electronic and Electrical Engineers (IEEE) 802.16 standard.

BRIEF DESCRIPTION OF THE DRAWINGS

So that the manner in which the above-recited features of the present disclosure can be understood in detail, a more particular description, briefly summarized above, may be had by reference to embodiments, some of which are illustrated in the appended drawings. It is to be noted, however, that the appended drawings illustrate only certain typical embodiments of this disclosure and are therefore not to be considered limiting of its scope, for the description may admit to other equally effective embodiments.

FIG. 4 illustrates information elements within a DL-MAP;

FIG. 5 illustrates a MAC PDU being sent from a base station's MAC layer to a subscriber station's MAC layer;

DETAILED DESCRIPTION

Wireless communication systems have become an important means by which many people worldwide have come to communicate. A wireless communication system may provide communication for a number of subscriber stations, each of which may be serviced by a base station. As used herein, the term "subscriber station" refers to an electronic device that may be used for voice and/or data communication over a wireless communication system. Examples of subscriber stations include cellular phones, personal digital assistants (PDAs), handheld devices, wireless modems, laptop computers, personal computers, etc. A subscriber station may alternatively be referred to as an access terminal, a mobile terminal, a mobile station, a remote station, a user terminal, a terminal, a subscriber unit, a mobile device, a wireless device, user equipment, or some other similar terminology. The term "base station" refers to a wireless communication station that is installed at a fixed location and used to communicate with subscriber stations. A base station may alternatively be referred to as an access point, a Node B, an evolved Node B, or some other similar terminology.

A subscriber station may communicate with one or more base stations via transmissions on the uplink and the downlink. The uplink (or reverse link) refers to the communication link from the subscriber station to the base station, and the downlink (or forward link) refers to the communication link from the base station to the subscriber station.

The resources of a wireless communication system (e.g., bandwidth and transmit power) may be shared among multiple subscriber stations. A variety of multiple access techniques are known, including code division multiple access (CDMA), time division multiple access (TDMA), frequency division multiple access (FDMA), orthogonal frequency division multiple access (OFDMA), single-carrier frequency division multiple access (SC-FDMA), and so forth.

Figure 1:
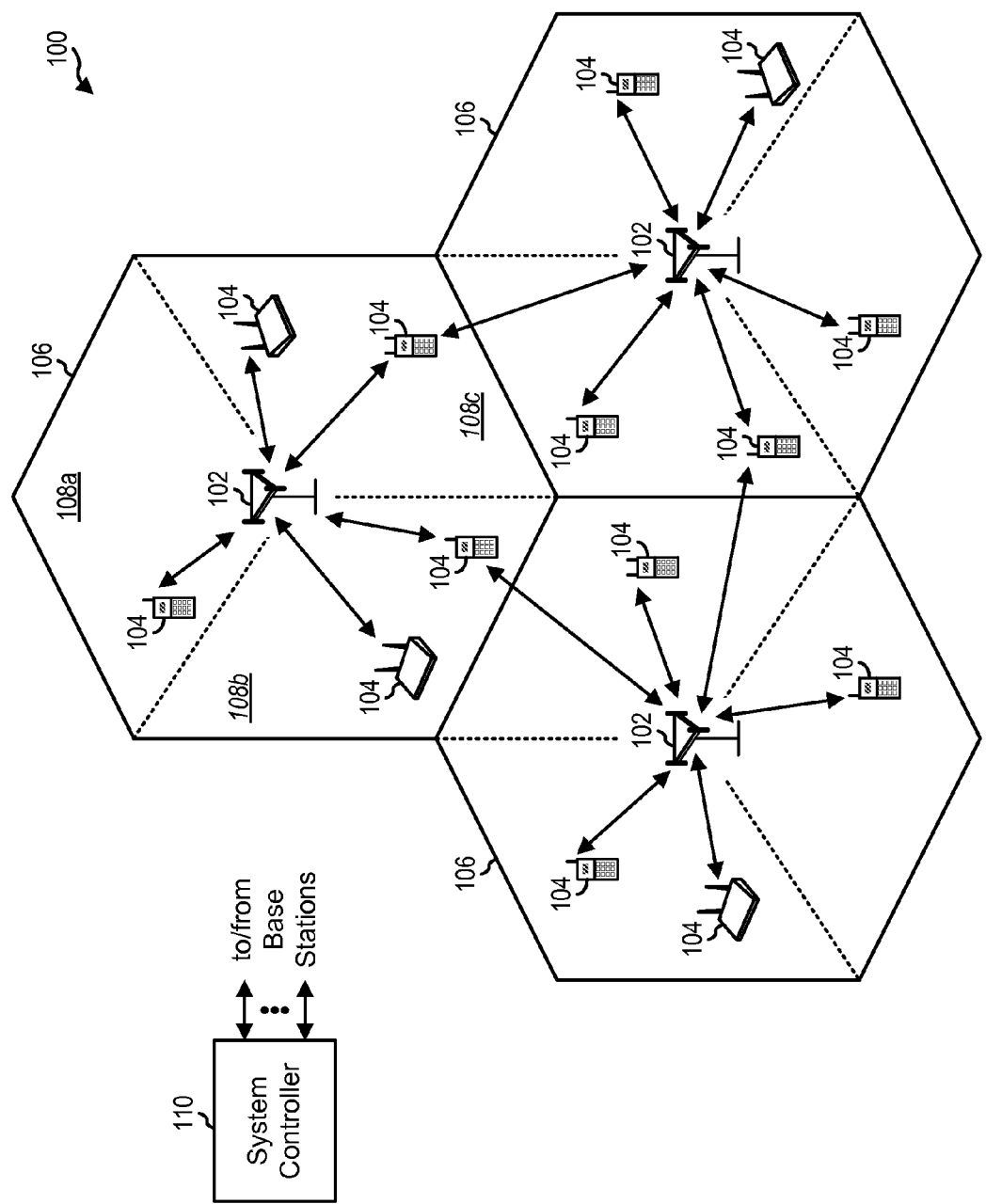
FIG. 1 shows an example of a wireless communication system in which the methods and apparatus disclosed herein may be utilized.

FIG. 1 shows an example of a wireless communication system 100 in which the methods and apparatus disclosed herein may be utilized. The wireless communication system 100 includes multiple base stations (BS) 102 and multiple subscriber stations (SS) 104. Each base station 102 provides communication coverage for a particular geographic area 106. The term "cell" can refer to a base station 102 and/or its coverage area 106 depending on the context in which the term is used.

To improve system capacity, a base station coverage area 106 may be partitioned into multiple smaller areas, e.g., three smaller areas 108a, 108b, and 108c. Each smaller area 108a, 108b, 108c may be served by a respective base transceiver station (BTS). The term "sector" can refer to a BTS and/or its coverage area 108 depending on the context in which the term is used. For a sectorized cell, the BTSs for all sectors of that cell are typically co-located within the base station 102 for the cell.

Subscriber stations 104 are typically dispersed throughout the system 100. A subscriber station 104 may communicate with zero, one, or multiple base stations 104 on the downlink and/or uplink at any given moment.

For a centralized architecture, a system controller 110 may couple to the base stations 102 and provide coordination and control for the base stations 102. The system controller 110 may be a single network entity or a collection of network entities. For a distributed architecture, base stations 102 may communicate with one another.

The methods and apparatus of the present disclosure may be utilized in a broadband wireless communication network. The term "broadband wireless" refers to technology that has the capability of providing at least wireless, voice, Internet, and/or data network access over a given area.

The Institute of Electronic and Electrical Engineers (IEEE) 802.16 Working Group on Broadband Wireless Access Standards aims to prepare formal specifications for the global deployment of broadband Wireless Metropolitan Area Networks. Although the 802.16 family of standards is officially called WirelessMAN, it has been called "WiMAX" (which stands for the "Worldwide Interoperability for Microwave Access") by an industry group called the WiMAX Forum. Thus, the term "WiMAX" refers to a standards-based broadband wireless technology that provides high-throughput broadband connections over long distances. As used herein, the term "WiMAX network" refers to a wireless communication network that is configured in accordance with one or more WiMAX standards. WiMAX is an example of a broadband wireless technology in which the methods and apparatus of the present disclosure may be utilized.

Figure 2:
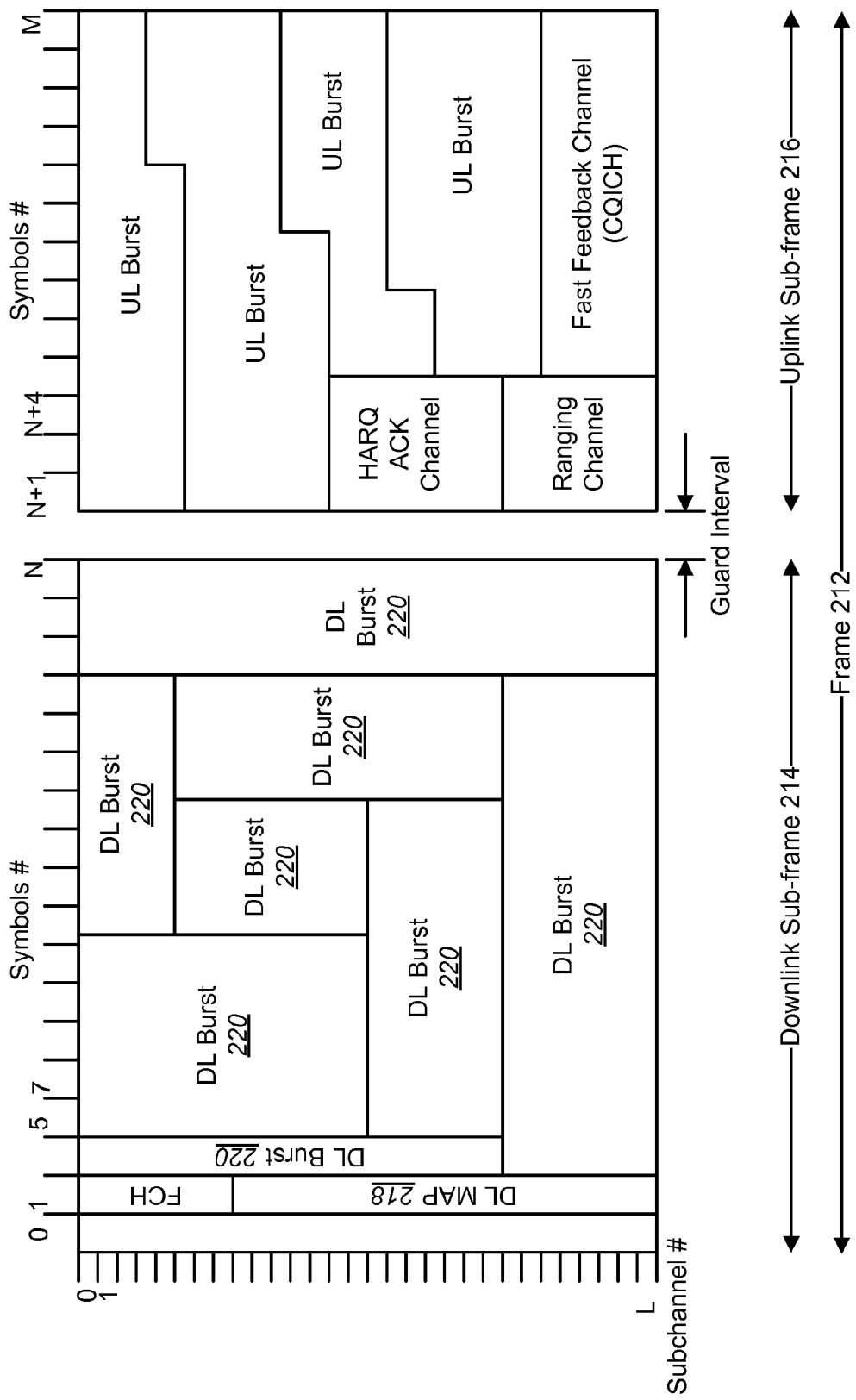
FIG. 2 illustrates a frame structure for a WiMAX network operating in time division duplexing (TDD) mode.

Reference is now made to FIG. 2. In current WiMAX standards, the medium access control (MAC) layer supports time division duplexing (TDD). In TDD mode, a frame 212 may be divided into two subframes: a downlink subframe 214 followed by an uplink subframe 216. The downlink subframe 214 and the uplink subframe 216 may be transmitted on the same carrier frequency at different times.

The downlink subframe 214 includes a DL MAP 218 for resource allocation of downlink bursts 220. The downlink subframe 214 also includes the downlink bursts 220. The information in the DL MAP 218 makes it possible for a subscriber station 104 to identify the downlink bursts 220 allocated to it by the base station 102.

Figure 3:
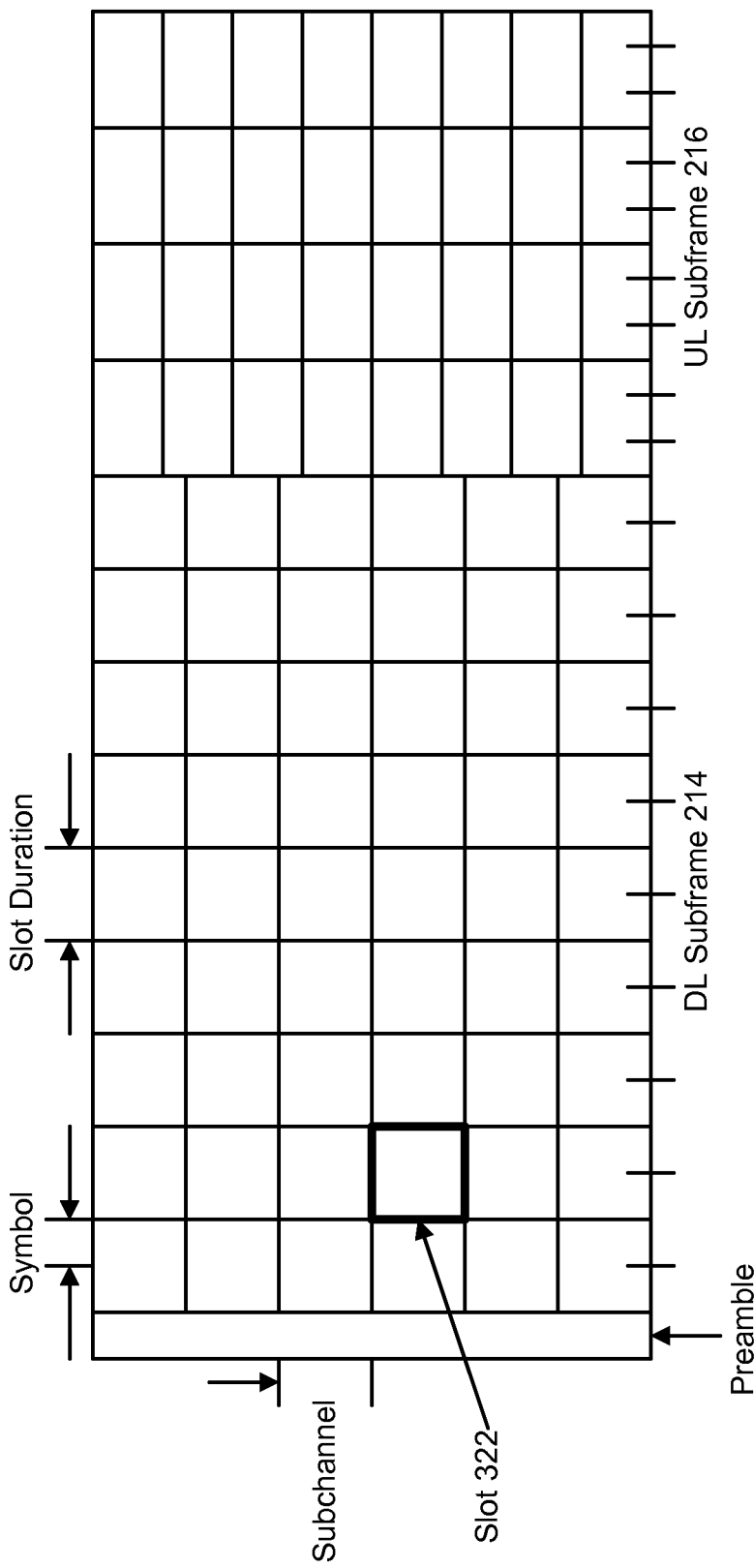
FIG. 3 illustrates a slot in a WiMAX network.

Reference is now made to FIG. 3. In current WiMAX standards, the MAC layer allocates time/frequency resources to various users in units of slots 322, which is the smallest quanta of the physical (PHY) layer resource that can be allocated to a single user in the time/frequency domain. A burst 220 is an allocation of one or more continuous slots 322 with the same modulation and coding scheme.

Reference is now made to FIG. 4. The DL MAP 218 may include one or more information elements 424. A DL-MAP information element (IE) 424 describes a downlink burst profile 426. A downlink burst profile 426 corresponds to a downlink burst 220. A downlink burst profile 426 describes the combination of modulation constellation, code rate, and forward error correction (FEC) used during the corresponding downlink burst 220.

Reference is now made to FIG. 5. The MAC protocol data unit (PDU) 528 is the data unit exchanged between the base station's MAC layer 530a and the subscriber station's MAC layer 530b.

The MAC PDU 528 includes a fixed length MAC header 532, which may be followed by a payload 534.

Before any data transmission happens, the base station 102 and the subscriber station 104 establish a unidirectional logical link, called a connection 536, between the two MAC-layer peers 530a, 530b. A connection 536 can be unicast, multicast or broadcast. Each connection 536 may be identified by a connection identifier (CID) 538. The subscriber stations 104 check the CIDs 538 in the received PDUs 528 and retain only those PDUs 528 that are addressed to them.

The present disclosure relates to multicasting in a wireless communication network, such as a WiMAX network. Multicasting enables efficient large-scale content distribution and is becoming more and more popular in network service.

In general terms, multicasting is a tool used in networking that allows for transmitting information to a select group of users. Multicasting allows packets to be sent from one location in the network (the source) to many other locations, without unnecessary packet duplication. The source may send one packet, and this packet may be replicated as needed in the network to reach as many end-users as necessary. Being able to provide multicast services so that bandwidth is not wasted on transmitting identical packets to each and every recipient may be important for wireless networks, as they have limited transmission resources.

Multicast services may be used for applications such as television broadcasting, online games, video conferencing, video surveillance, point-to-multipoint virtual LAN services, etc. Multicast services may be utilized for both fixed and mobile subscribers. Multicast services may be provided to a large number (e.g., thousands) of users in a cell area 106.

Figure 6:
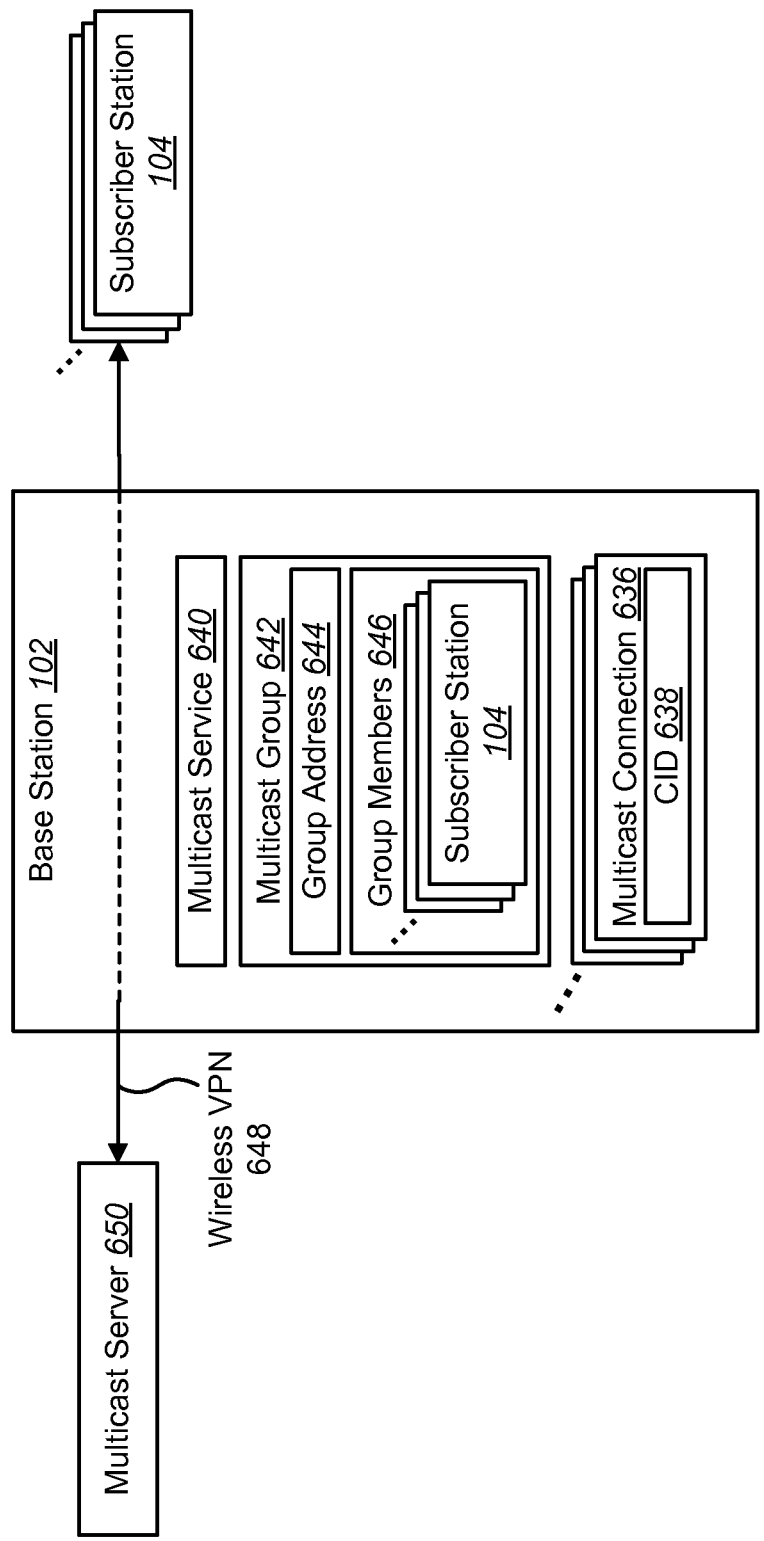
FIG. 6 illustrates a multicast connection being used for multicast services on the downlink.

Reference is now made to FIG. 6. The concept of a group is relevant to multicasting. A multicast service 640 is typically associated with a multicast group 642. The sender (or source) may transmit to the group address 644, so that only members 646 of the group 642 receive the multicast data.

WiMAX supports multicast connections 636 that can be used for multicast services 640 on the downlink. The base station 102 may associate a connection 636 and a CID 638 with a particular multicast service 640. All the subscriber stations 104 in the multicast group 642 may be associated with the connection 636.

In a multicast scenario, a wireless virtual private network (VPN) 648 may be configured between a multicast server 650 and the subscriber stations 104 via the base station 102.

The base station 102 may establish a downlink multicast service 640 by creating a connection 636 with each subscriber station 104 to be associated with the service 640. To ensure proper multicast operation, the CID 638 used for the service 640 may be the same for all subscriber stations 104 on the same channel that participate in the connection 636. The subscriber stations 104 do not need to be aware that the connection 636 is for a multicast service 640, although they may be. The data transmitted on the connection 636 with the given CID 638 may be received and processed by the MAC layer 530b of each involved subscriber station 104. The quality of service (QoS) offered and the traffic parameters may be common for all subscriber stations 104 receiving the multicast service 640.

A multicast service 640 may be accessed by a subscriber station 104 after it becomes aware of it through, for example, an electronic program guide (EPG), a web page, etc. This may be handled in the application layer. The multicast addresses may be available via a multicast portal, an HTTP page, etc.

In accordance with the current WiMAX multicast protocols, the subscriber station 104 needs to parse all the PDUs 528 inside each downlink burst 220 per frame 212 to identify the multicast PDUs (i.e., the PDUs 528 that correspond to a multicast service 640). Since the PDUs 528 within a downlink burst 220 are variable in length, modulation scheme, and encryption key, the corresponding processing time and consumed power may be significant. For a subscriber station 104 with limited battery life (e.g., a mobile device), any unnecessary waste of power results in a reduction of the service time.

The Unsolicited Grant Service (UGS) is one of the QoS classes in WiMAX standards. It periodically allocates fixed bandwidth for constant bit rate traffic. One application that may benefit from a UGS-like traffic model is multicast services.

Figure 7:
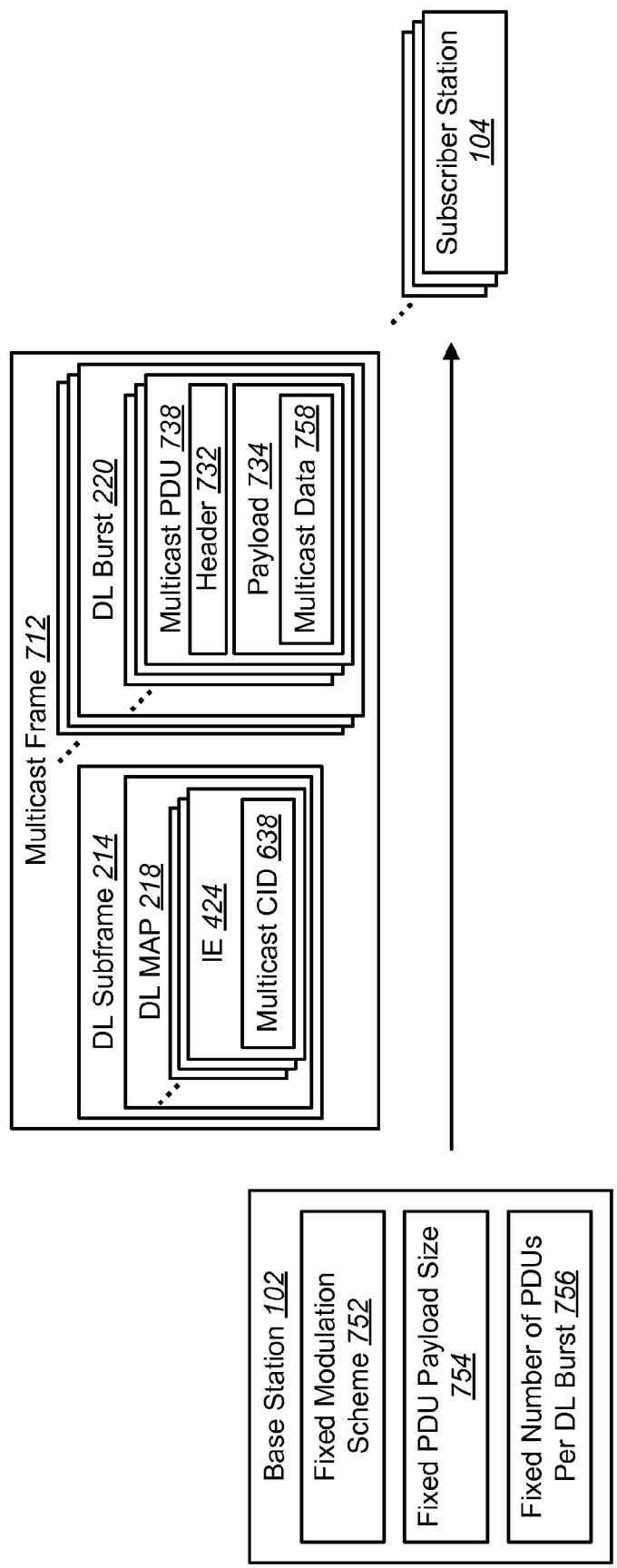
FIG. 7 illustrates a base station determining certain fixed parameters for allocation of downlink bursts to deliver multicast data.

Reference is now made to FIG. 7. In accordance with the present disclosure, a base station 102 may determine a fixed modulation scheme 752, a fixed PDU payload size 754, and a fixed number 756 of PDUs 738 per downlink burst 220 for transmission of multicast data 758 to subscriber stations 104. In this context, the term "fixed" means constant (i.e., not changing or varying from one multicast frame 712 to another). In other words, in accordance with the present disclosure, the multicast PDUs 738 that are transmitted by a particular base station 102 may each have the same modulation scheme 752, the same PDU payload size 754, and the same number 756 of PDUs 738 per downlink burst 220. The subscriber stations 104 may know what the modulation scheme 752, PDU payload size 754, and number 756 of PDUs 738 per downlink burst 220 are for multicast data 758.

Frames 712 in which the downlink subframe 214 is used to transmit multicast data 758 may be referred to herein as multicast frames 712. The base station 102 may allocate downlink bursts 220 to deliver the multicast data 758 to the subscriber stations 104 via PDUs 738 using the fixed modulation scheme 752, the fixed PDU payload size 754, and the fixed number 756 of PDUs 738 per downlink burst 220. The multicast data 758 may be distributed into multicast frames 712 that are allocated periodically.

In one implementation, the DL-MAP IE 424 may include a CID 638 when the inc_CID flag is turned on. The inc_CID flag can be turned on and off using the CID_SWITCH_IE DLMAP-IE (DICU=15 extended DIUC=04). The DL-MAP IEs 424 in a DL-MAP may be sent without including a CID 538 initially (e.g., inc_CID flag=0). Whenever the CID_SWITCH_IE appears, the inc_CID flag may be toggled and subsequent DL-MAP IEs 424 may include or exclude the CID 538 depending on the status of the inc_CID flag.

In one implementation, the inc_CID flag may be on (e.g., inc_CID flag=1) whenever the base station 102 is sending multicast traffic. Or a DL-MAP IE 424 that includes a CID 538 is assumed to point to multicast bursts. The subscriber station 104 can then decide to process DL-MAP IEs 424 after the inc_CID flag is toggled on, based on its association to one or more multicast groups 642 or no association at all. Thus, a portion of the downlink subframe 214 may be dedicated to multicast traffic while another portion of the downlink subframe 214 (when the inc_CID flag is toggled off) can be used for other types of traffic.

Because the modulation scheme 752, PDU payload size 754, and number 756 of PDUs 738 per downlink burst 220 are fixed for multicast frames 712, the size of each downlink burst 220 becomes fixed (constant) in multicast frames 712. This may lead to lower downlink burst 220 and PDU 738 processing overhead in the subscriber stations 104.

As mentioned, the multicast frames 712 may be allocated periodically. The subscriber stations 104 may know when the multicast frames 712 are going to be allocated. Thus, if a subscriber station 104 does not belong to any multicast groups 642, the subscriber station 104 may simply bypass the processing of multicast frames 712.

If a subscriber station 104 belongs to at least one multicast group 642, the subscriber station 104 may search for multicast CIDs 638 in DL-MAP IEs 424 in multicast frames 712. In response to identifying a multicast CID 638 in a DL-MAP IE 424 in a multicast frame 712, the subscriber station 104 may bypass the parsing of each PDU's MAC header 732 within a corresponding downlink burst 220 in the multicast frame 712. This is because the PDU payload size 754 is already known (because the base station 102 has defined a fixed PDU payload size 754 for multicast frames 712) and does not need to be determined from the MAC header 732.

The multicast techniques disclosed herein may be utilized in a WiMAX network. Thus, the base station 102 and the subscriber stations 104 shown in the drawings may support a WiMAX standard. Also, for simplicity, only a few base stations 102 and only a few subscriber stations 104 are shown in the drawings. However, the techniques disclosed herein may be practiced in a wireless communication network that includes multiple base stations 102 and many more subscriber stations 104 than are shown in the drawings.

Figure 8:
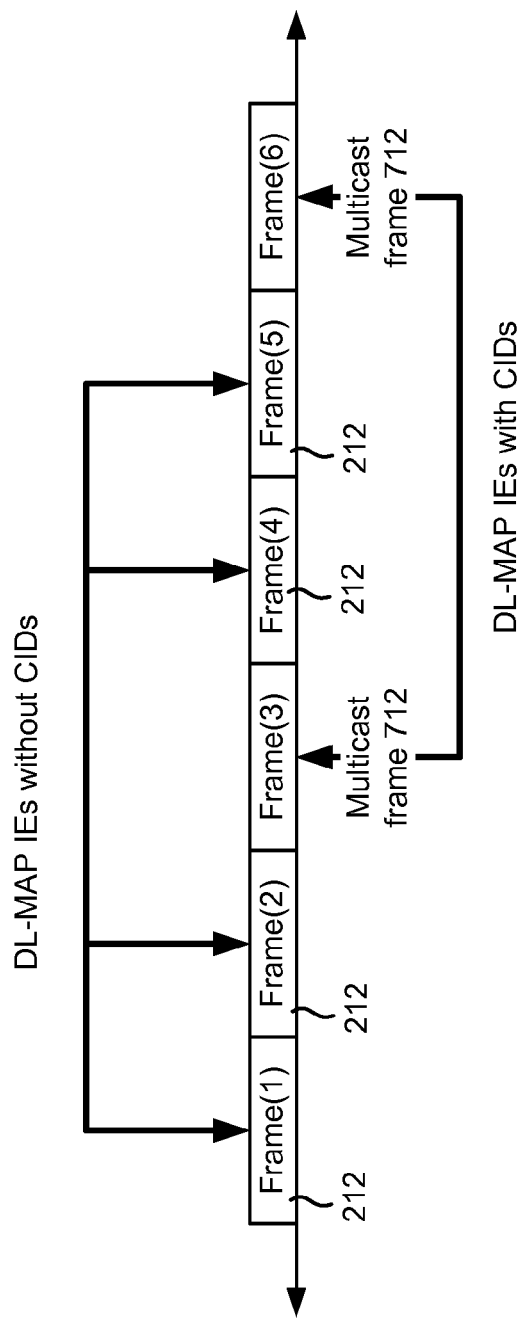
FIG. 8 illustrates how multicast frames may be allocated periodically.

Reference is now made to FIG. 8, which illustrates an example showing how multicast frames 712 may be allocated in accordance with the present disclosure. Several frames 212 are shown. Some of these frames 212 are multicast frames 712. In particular, every third frame 212 is a multicast frame 712.

Figure 9:
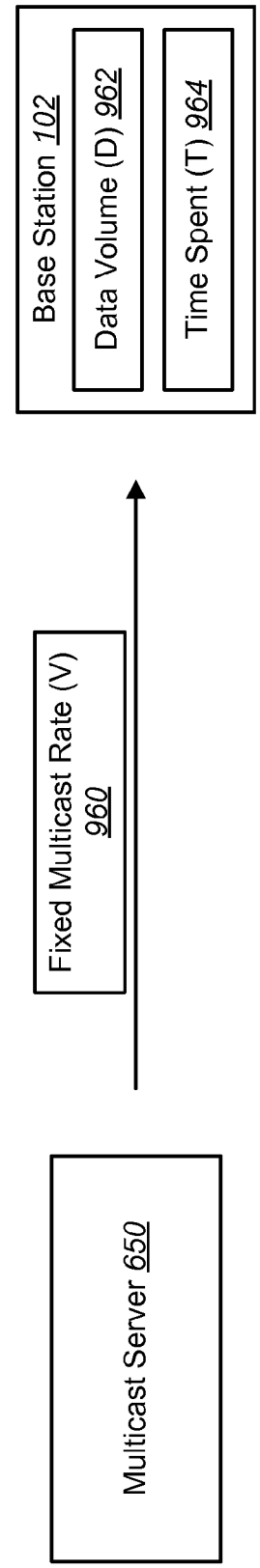
FIG. 9 illustrates a base station determining a traffic data volume.

Reference is now made to FIG. 9. The base station 102 may receive information about a fixed multicast rate 960 from the multicast server 650. The multicast rate 960 is the rate at which multicast data 758 should be transmitted to the subscriber stations 104.

The base station 102 may calculate a traffic data volume D 962 based on the following equation:

$$D = V * T \quad (1)$$

where V is the fixed multicast rate 960 (which may be specified by the multicast server 650), and T is time spent 964 during a multicast data transmission. D may be expressed in terms of slots, and more specifically, as the slots required per multicast allocation.

With respect to V, the multicast server 650 works with the base stations 102 to deliver a fixed multicast rate 960 from the multicast server 650 perspective. Since a CID 538 is negotiated for multicast traffic, the QoS parameters for the multicast traffic are known before the multicast connection 636 is set up via the DSx procedure defined in the IEEE 802.16e specification. Depending on the class of service the multicast traffic is using, the data rate 960 of the multicast traffic should be known.

Once the multicast data rate 960 is known, the modulation scheme 752 may be chosen to ensure the subscriber station 104 with the lowest channel quality in the multicast group 642 can be serviced. With the data rate 960 and the modulation scheme 752 determined, the base station 102 can calculate the number of resources (in terms of downlink slots 322) that are required within a fixed time period, for example, 500 slots/s. If the average data packet size, or Maximum Transmission Unit (MTU), of the multicast service 640 is known, the previous logic can also yield the number of data packets per second and the number of slots 322 per packet.

When the number of data packets per second and/or the number of slots 322 per second or per packet is known, the base station 102 can then choose the frequency to allocate the multicast burst. In one implementation, one of the constraints is that the frequency of the allocation and the size of the allocation must meet the required per-second criteria in order to satisfy the QoS requirement of the multicast service 640.

For example, suppose that a video broadcast service of 1.2 Mbps is set up with several subscriber stations 104 that wish to receive a broadcast television service. The 1.2 Mbps rate requirement may be a provisioning value that is set by the service provider. The Video Broadcast Application interfaces with the base station 102 so that this requirement is communicated to the subscriber stations 104 during the service flow setup procedure described in IEEE 802.16e. The subscriber stations 104 with the worst quality channel can support up to a QPSK-½ coding rate. Thus, in this example, assume that the QPSK-½ coding rate is chosen. Each downlink slot with a QPSK-½ coding can support only 48 bytes of data, including all the IEEE 802.16e overhead. Assuming that the IEEE 802.16e overhead adds about 10 bytes for each data packet sent, if the MTU of the multicast connection 636 is 1500 bytes, then a 1510 bytes allocation is given per PDU 528, or around (1510/48=)32 slots/packet. The 1.2 Mbps requirement means 150 kbytes/s, or 100 packets per second, or 3200 slots per second. If the MTU is not given, then the base station 102 can decide on the data packet size to be sent. The goal is to convert the rate requirement to a slot requirement. If the size of the packet to be sent is M, then (M+10/48) will determine the slots/packet and (150 kbyte/s/M) determines the number of packets per second. So to support this 1.2 Mbps multicast service, the base station 102 allocates 3200 slots within one second.

To determine T, the delay requirement of the multicast service 640 should be known. Using the above example, if the video broadcast service can tolerate 50 ms of delay, or 10 frames assuming 5 ms per frame, then it means that the base station 102 should send some data every 10 frames, or 20 multicast allocations per second. Thus, the base station 102 should allocate 3200 slots/s/20 allocation/s=160 slots every 10 frames to support the multicast service 640. Since each packet uses 32 slots, each allocation of 160 slots sends 5 packets. In this example, T=50 ms, V=3200 slots/s so D=3200 slots/s*50 ms=160 slots.

As the above example shows, the number of packets and the size of the packets may be interrelated. In fact, defining one parameter, relative to the required data rate, automatically defines the other. In the above example, defining the size of the packet (M) determined the number of packets to be transmitted per allocation. The reverse is also true.

Figure 10:
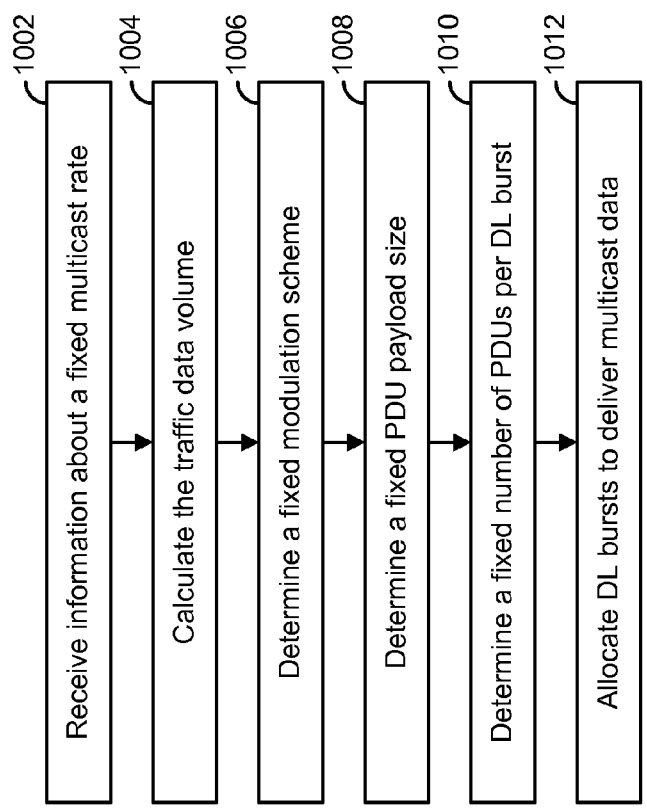
FIG. 10 illustrates a method that may be implemented by a base station in accordance with the present disclosure.

FIG. 10 illustrates a method 1000 that may be implemented by a base station 102 in accordance with the present disclosure. The base station 102 may support an IEEE 802.16 standard (WiMAX).

The method 1000 may include receiving 1002 information about a fixed multicast rate 960 from a multicast server 650.

A wireless VPN 648 may be configured between the multicast server 650 and the subscriber stations 104 via the base station 102. The method 1000 may also include calculating 1004 the traffic data volume (D) 962 based on equation (1) above. As expressed in equation (1), the traffic data volume 962 may depend on the fixed multicast rate (V) 960, as well as the time spent during a multicast data transmission (T) 964.

The method 1000 may also include determining 1006 a fixed modulation scheme 752, determining 1008 a fixed PDU payload size 754, and determining 1010 a fixed number 756 of PDUs 738 per downlink burst 220 for transmission of multicast data 758 to subscriber stations 104. The value of the traffic data volume 962 may be used to determine 1008 the fixed PDU payload size 754 and to determine 1010 the fixed number of PDUs 738 per downlink burst 220.

The method 1000 may also include allocating 1012 downlink bursts 220 to deliver the multicast data 758 to the subscriber stations 104 via PDUs 738 using the fixed modulation scheme 752, the fixed PDU payload size 754, and the fixed number 756 of PDUs 738 per DL burst 220. The multicast data 758 may be distributed into multicast frames 712 that are allocated periodically. The downlink bursts 220 in the multicast frames 712 may be described by DL-MAP IEs 424 that include multicast CIDs 638.

Figure 11:
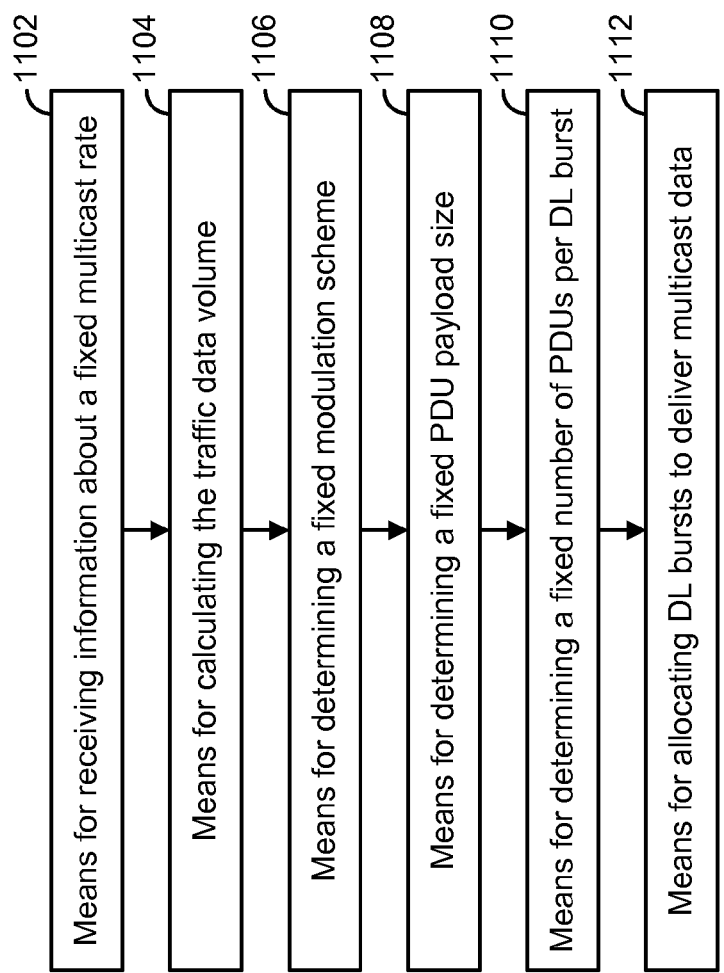
FIG. 11 illustrates means-plus-function blocks corresponding to the method of FIG. 10.

The method 1000 of FIG. 10 described above may be performed by various hardware and/or software component(s) and/or module(s) corresponding to the means-plus-function blocks 1100 illustrated in FIG. 11. In other words, blocks 1002 through 1012 illustrated in FIG. 10 correspond to means-plus-function blocks 1102 through 1112 illustrated in FIG. 11.

Figure 12:
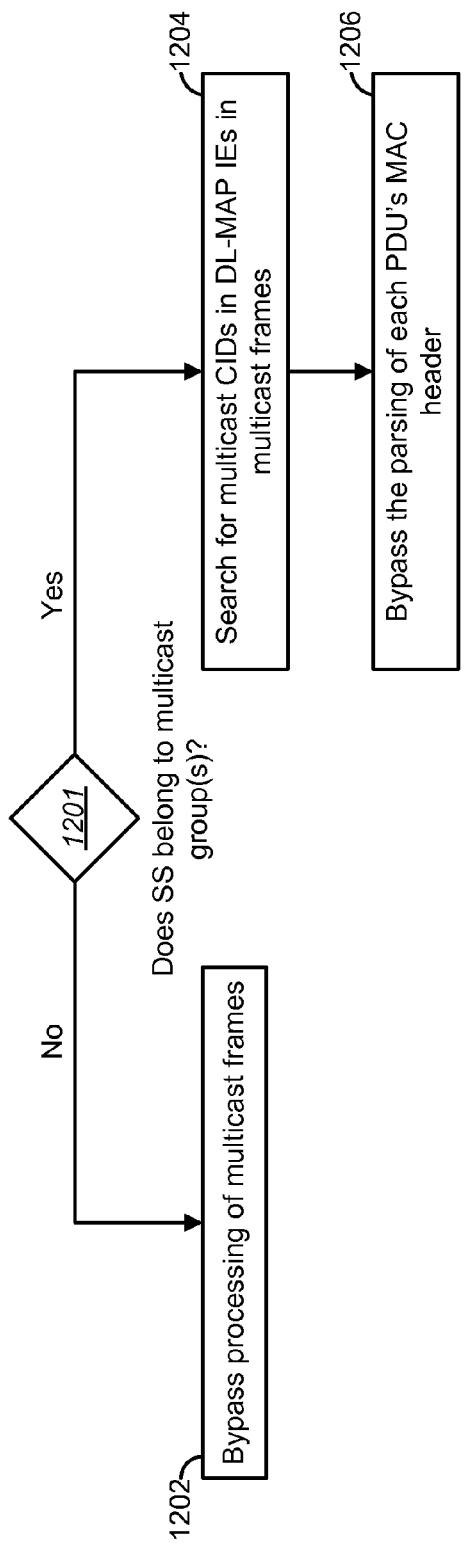
FIG. 12 illustrates a method that may be implemented by a subscriber station in accordance with the present disclosure.

FIG. 12 illustrates a method 1200 that may be implemented by a subscriber station 104 in accordance with the present disclosure. The subscriber station 104 may support an IEEE 802.16 standard (WiMAX).

If it is determined 1201 that the subscriber station 104 does not belong to any multicast groups 642, the subscriber station 104 may bypass 1202 the processing of multicast frames 712.

If it is determined 1201 that the subscriber station 104 belongs to at least one multicast group 642, then the subscriber station 104 may search 1204 for multicast CIDs 638 in DL-MAP IEs 424 in multicast frames 712. In response to identifying a multicast CID 638 in a DL-MAP IE 424 in a multicast frame 712, the subscriber station 104 may bypass 1206 the parsing of each PDU's MAC header 732 within a corresponding downlink burst 220 in the multicast frame 712.

Figure 13:
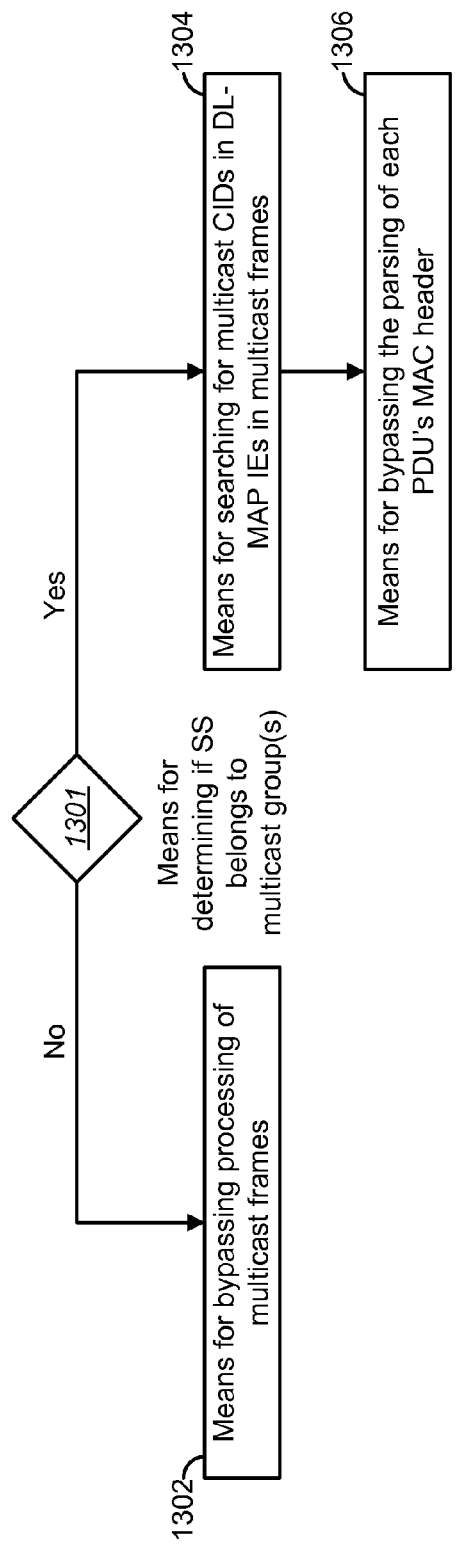
FIG. 13 illustrates means-plus-function blocks corresponding to the method of FIG. 12.

The method 1200 of FIG. 12 described above may be performed by various hardware and/or software component(s) and/or module(s) corresponding to the means-plus-function blocks 1300 illustrated in FIG. 13. In other words, blocks 1201 through 1206 illustrated in FIG. 12 correspond to means-plus-function blocks 1301 through 1306 illustrated in FIG. 13.

The techniques disclosed herein may provide several advantages relative to known approaches. For example, the techniques disclosed herein may save power on a per-frame basis by reducing the number of frames to be processed. For example, a subscriber station that does not belong to any multicast group may skip (i.e., not process) multicast frames 712.

In addition, the techniques disclosed herein may decrease the processing overhead of multicast traffic on a per-PDU basis, which may result in higher throughput. For example, by recognizing the multicast CID(s) 638 in the DL MAP IEs 424, a subscriber station 104 can bypass the parsing of each PDU's MAC header 732. This is because the PDU payload size is already known (because the base station has defined a fixed PDU payload size 754 for multicast frames 712) and does not need to be determined from the MAC header 732.

Moreover, the techniques disclosed herein may increase the power savings on a per-PDU basis. This is because the techniques disclosed herein may reduce the processing overhead (as described above), which may have the effect of increasing the power savings on a per-PDU basis.

As indicated above, the methods and apparatus disclosed herein may be implemented in WiMAX networks. However, the scope of the present disclosure should not be limited in this regard. The methods and apparatus disclosed herein may be utilized in other types of wireless communication networks as well.

Figure 14:
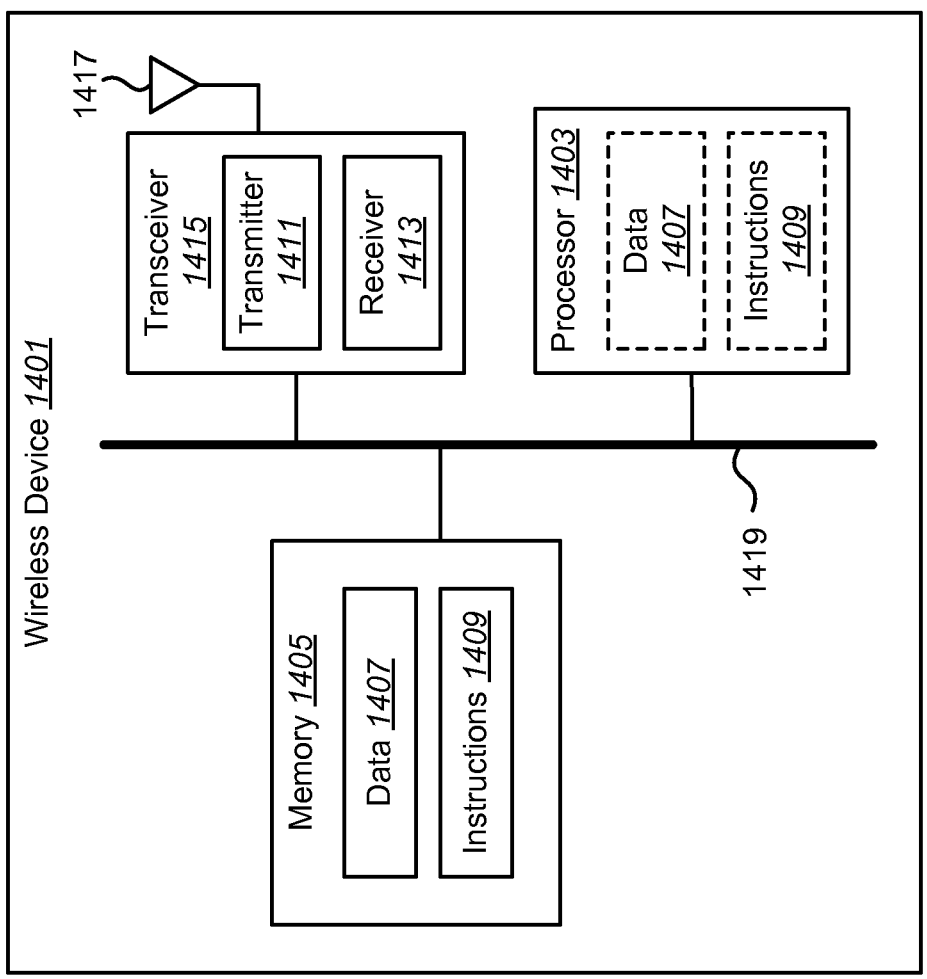
FIG. 14 illustrates certain components that may be included within a wireless device.

FIG. 14 illustrates certain components that may be included within a wireless device 1401. The wireless device 1401 may be a subscriber or base station.

The wireless device 1401 includes a processor 1403. The processor 1403 may be a general purpose single- or multi-chip microprocessor (e.g., an ARM), a special purpose microprocessor (e.g., a digital signal processor (DSP)), a microcontroller, a programmable gate array, etc. The processor 1403 may be referred to as a central processing unit (CPU). Although just a single processor 1403 is shown in the wireless device 1401 of FIG. 14, in an alternative configuration, a combination of processors (e.g., an ARM and DSP) could be used.

The wireless device 1401 also includes memory 1405. The memory 1405 may be any electronic component capable of storing electronic information. The memory 1405 may be embodied as random access memory (RAM), read only memory (ROM), magnetic disk storage media, optical storage media, flash memory devices in RAM, on-board memory included with the processor, EPROM memory, EEPROM memory, registers, and so forth, including combinations thereof.

Data 1407 and instructions 1409 may be stored in the memory 1405. The instructions 1409 may be executable by the processor 1403 to implement the methods disclosed herein. Executing the instructions 1409 may involve the use of the data 1407 that is stored in the memory 1405.

The wireless device 1401 may also include a transmitter 1411 and a receiver 1413 to allow transmission and reception of signals between the wireless device 1401 and a remote location. The transmitter 1411 and receiver 1413 may be collectively referred to as a transceiver 1415. An antenna 1417 may be electrically coupled to the transceiver 1415. The wireless device 1401 may also include (not shown) multiple transmitters, multiple receivers, multiple transceivers and/or multiple antenna.

The various components of the wireless device 1401 may be coupled together by one or more buses, which may include a power bus, a control signal bus, a status signal bus, a data bus, etc. For the sake of clarity, the various buses are illustrated in FIG. 14 as a bus system 1419.

The techniques described herein may be used for various communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA)

to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

In the above description, reference numbers have sometimes been used in connection with various terms. Where a term is used in connection with a reference number, this is meant to refer to a specific element that is shown in one or more of the Figures. Where a term is used without a reference number, this is meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read and/or write information from/to the memory. Memory that is integral to a processor is in electronic communication with it.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

The functions described herein may be implemented in hardware, software, firmware, or any combination thereof. If implemented in software, the functions may be stored as one or more instructions on a computer-readable medium. The term "computer-readable medium" refers to any available medium that can be accessed by a computer. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIGS. 10 and 12, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a device may obtain the various methods upon coupling or providing the storage means to the device. Moreover, any suitable technique for providing the techniques described herein to a device can be utilized.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for providing a multicast scheme, the method being implemented by a base station, the method comprising:
receiving from a multicast server, at the base station, information about a fixed multicast rate;
determining, by the base station and based at least in part upon the fixed multicast rate, a fixed modulation scheme, a fixed protocol data unit (PDU) payload size, and a fixed number of PDUs per downlink (DL) burst for transmission of multicast data to subscriber stations, the fixed modulation scheme, the fixed PDU payload size, and the fixed number of PDUs per DL burst remaining constant from one DL burst to a next DL burst and from one multicast frame to a next multicast frame; and
allocating, by the base station, DL bursts to multicast frames, to deliver the multicast data to the subscriber stations via PDUs using the fixed modulation scheme, the fixed PDU payload size, and the fixed number of PDUs per DL burst.

2. The method of claim 1, wherein the multicast frames are allocated periodically.

3. The method of claim 1, wherein the DL bursts in the multicast frames are described by DL-MAP information elements (IEs) that comprise multicast connection identifiers (CIDs).

4. The method of claim 1, wherein a wireless virtual private network (VPN) is configured between the multicast server and the subscriber stations via the base station.

5. The method of claim 1, further comprising calculating a traffic data volume D based on D=V*T, wherein V is the fixed multicast rate, and wherein T is time spent during a multicast data transmission.

6. A base station for providing a multicast scheme, comprising:
- a processor;
- memory in electronic communication with the processor;
- instructions stored in the memory, the instructions being executable by the processor to:
  - receive from a multicast server, at the base station, information about a fixed multicast rate;
  - determine, based at least in part upon the fixed multicast rate, a fixed modulation scheme, a fixed protocol data unit (PDU) payload size, and a fixed number of PDUs per downlink (DL) burst for transmission of multicast data to subscriber stations, the fixed modulation scheme, the fixed PDU payload size, and the fixed number of PDUs per DL burst remaining constant from one DL burst to a next DL burst and from one multicast frame to a next multicast frame; and
  - allocate DL bursts to multicast frames, to deliver the multicast data to the subscriber stations via PDUs using the fixed modulation scheme, the fixed PDU payload size, and the fixed number of PDUs per DL burst.

7. The base station of claim 6, wherein the multicast frames are allocated periodically.

8. The base station of claim 6, wherein the DL bursts in the multicast frames are described by DL-MAP information elements (IEs) that comprise multicast connection identifiers (CIDs).

9. The base station of claim 6, wherein a wireless virtual private network (VPN) is configured between the multicast server and the subscriber stations via the base station.

10. The base station of claim 6, wherein the instructions are also executable to calculate a traffic data volume D based on D=V*T, wherein V is the fixed multicast rate, and wherein T is time spent during a multicast data transmission.

11. A base station for providing a multicast scheme, comprising:
- means for receiving from a multicast server, at the base station, information about a fixed multicast rate;
- means for determining, based at least in part upon the fixed multicast rate, a fixed modulation scheme, a fixed protocol data unit (PDU) payload size, and a fixed number of PDUs per downlink (DL) burst for transmission of multicast data to subscriber stations, the fixed modulation scheme, the fixed PDU payload size, and the fixed number of PDUs per DL burst remaining constant from one DL burst to a next DL burst and from one multicast frame to a next multicast frame; and
- means for allocating DL bursts to multicast frames, to deliver the multicast data to the subscriber stations via PDUs using the fixed modulation scheme, the fixed PDU payload size, and the fixed number of PDUs per DL burst.

12. The base station of claim 11, wherein the multicast frames are allocated periodically.

13. The base station of claim 11, wherein the DL bursts in the multicast frames are described by DL-MAP information elements (IEs) that comprise multicast connection identifiers (CIDs).

14. The base station of claim 11, wherein a wireless virtual private network (VPN) is configured between the multicast server and the subscriber stations via the base station.

15. The base station of claim 11, further comprising means for calculating a traffic data volume D based on D=V*T, wherein V is the fixed multicast rate, and wherein T is time spent during a multicast data transmission.

16. A computer-program product for facilitating a base station to provide a multicast scheme, the computer-program product comprising a non-transitory computer-readable medium having instructions thereon, the instructions comprising:
- code for receiving from a multicast server, at the base station, information about a fixed multicast rate;
- code for determining, at the base station and based at least in part upon the fixed multicast rate, a fixed modulation scheme, a fixed protocol data unit (PDU) payload size, and a fixed number of PDUs per downlink (DL) burst for transmission of multicast data to subscriber stations, the fixed modulation scheme, the fixed PDU payload size, and the fixed number of PDUs per DL burst remaining constant from one DL burst to a next DL burst and from one multicast frame to a next multicast frame; and
- code for allocating, at the base station, DL bursts to multicast frames, to deliver the multicast data to the subscriber stations via PDUs using the fixed modulation scheme, the fixed PDU payload size, and the fixed number of PDUs per DL burst.

17. The computer-program product of claim 16, further comprising:
- code for calculating a traffic data volume D based on D=V*T, wherein V is the fixed multicast rate, and wherein T is time spent during a multicast data transmission.

* * * * *